(12) United States Patent
Nakayama

(10) Patent No.: US 6,198,070 B1
(45) Date of Patent: Mar. 6, 2001

(54) LASER BEAM MACHINING METHOD AND LASER BEAM MACHINE

(75) Inventor: Masanori Nakayama, Fukuno-machi (JP)

(73) Assignee: Nippei Toyama Corporation, Tokyo (JP)

( * ) Notice: Subject to any disclaimer, the term of this patent is extended or adjusted under 35 U.S.C. 154(b) by 0 days.

(21) Appl. No.: 09/359,071

(22) Filed: Jul. 22, 1999

(30) Foreign Application Priority Data

Jul. 23, 1998 (JP) .................................................. 10-208448

(51) Int. Cl.[7] .................................................. B23K 26/00
(52) U.S. Cl. .............................. 219/121.68; 219/121.84; 219/121.7
(58) Field of Search ...................... 219/121.68, 121.84, 219/121.67, 121.72, 121.69, 121.71, 121.7

(56) References Cited

U.S. PATENT DOCUMENTS 5,582,749 * 12/1996 Mori et al. ...................... 219/121.84
5,767,479 * 6/1998 Kanaoka ........................ 219/121.61
5,910,261 * 6/1999 Mori et al. ..................... 219/121.71

FOREIGN PATENT DOCUMENTS

| 5-84589 | 4/1993 | (JP) | ............................. B23K/26/14 |
| 5-111784 | 5/1993 | (JP) | ............................. B23K/26/00 |
| 5-138382 | 6/1993 | (JP) | ............................. B23K/26/00 |
| 6-198485 | 7/1994 | (JP) | ............................. B23K/26/14 |
| 7-9175 | 1/1995 | (JP) | ............................. B23K/26/00 |
| 9-216081 | 8/1997 | (JP) | ............................. B23K/26/00 |
| 9-277071 | 10/1997 | (JP) | ............................. B23K/26/00 |

* cited by examiner

*Primary Examiner*—Patrick Ryan
*Assistant Examiner*—M. Alexandra Elva
(74) *Attorney, Agent, or Firm*—Sughrue, Mion, Zinn, Macpeak & Seas, PLLC

(57) ABSTRACT

A laser beam machining method includes the steps of, irradiating a laser beam on a machining portion of a workpiece for the machining thereof, blowing out an assist gas toward the machining portion of the workpiece continuously during the irradiating step, and blowing out a blow gas toward the machining portion intermittently during the irradiating step.

14 Claims, 6 Drawing Sheets

L1 ··· 6mm, 9mm
L2 ··· 12mm
L3 ··· 16mm
L4 ··· 19mm

LASER BEAM MACHINING METHOD AND LASER BEAM MACHINE

BACKGROUND OF THE INVENTION

1. Field of the Invention

This invention relates to a laser beam machining method and a laser beam machine for subjecting workpieces to machining using a laser beam.

2. Description of the Related Art

Laser beam machines are used for obtaining products of desired shape by cutting plate-like workpieces using a laser beam. On the occasion of the cutting work, piercing work is performed first. With the through-hole formed by piercing as a starting point, a machining head is moved to cut in accordance with a necessary locus such as a product's shape whereby the workpiece is cut into the desired shape.

In order to reduce the piercing time and to prevent the protrusion of molten substance on the surface of the workpiece, there have heretofore been proposed various methods.

The following methods (1)–(3), for example, have been proposed so as to do piercing work in a short time:

(1) As disclosed in Japanese Patent Unexamined Publication No. Hei.7-9175, while a nozzle is kept apart from the surface of a workpiece when piercing work is started, the workpiece is irradiated with a laser beam. As the piercing work progresses, the nozzle is gradually moved close to the workpiece.

(2) As disclosed in Japanese Patent Unexamined Publication No. Hei.5-138382, while the duty ratio of pulse oscillation is set lower when piercing work is started, and an laser output is raised by gradually raising the duty ratio of the pulse oscillation as the piercing work progresses.

(3) As disclosed in Japanese Patent Unexamined Publication No. Hei.5-111784, a nozzle is moved toward and away from a workpiece periodically when piercing work is performed.

However, these methods (1)–(3) are intended to decrease the molten substance left on the surface of the workpiece as much as possible when the piercing work is performed and further, by the use of the assist gas blown from the nozzle, to blow off the molten substance as well as oxidation. Therefore, a great deal of machining time has been needed because the piercing work cannot be performed in a short time, although the protrusion of the molten substance is prevented to some degree.

Further, the following methods (4)–(7) have been proposed as those for preventing molten substance from blowing up during cutting work:

(4) As disclosed in Japanese Patent Unexamined Publication No. Hei.5-84589, high-purity oxygen is used as the assist gas blown out of a center nozzle to the machining portion of a workpiece when cutting work is performed. And, a double structure including the center nozzle and a shielding nozzle is employed so as not to drag the air in the machining portion but to lower the flow rate. Thus, it has been arranged that shielding gas is blown out of the shielding nozzle around the assist gas blown out of the center nozzle.

(5) As disclosed in Japanese Patent Unexamined Publication No. Hei.9-216081, oxygen pressure from an auxiliary nozzle is set high so as to blow off molten metal.

(6) As disclosed in Japanese Patent Unexamined Publication No. Hei.6-198485, a double-structure nozzle is employed and a cooling gas is jetted from around a shielding gas, so as to reduce cutting width.

However, each of these methods (4)–(6) is intended to do ordinary cutting work satisfactorily by letting the nozzle have a double structure. Moreover, high-pressure oxygen and a cooled inert gas are used as auxiliary assist gases, so that these gases are continuously blown out during the cutting work for the purposes of blowing off the molten metal and suppressing oxidation. Therefore, when the cutting of a corner portion is started, these methods cannot effectively prevent molten substancefromblowingup inthatcorner portion. Inother words, excessive calorie and oxygen per unit hour causes a large amount of molten substance to be produced since the cutting speed in the corner portion is low. Further, the purity of the oxygen is lowered in the case of continuously blowing out the inert gas against the workpiece, so that oxidative action of material to be cut is damaged, and thus, good cutting operation is not obtained.

There is another method (7) proposed for decreasing the protrusion of molten substance around a through-hole when piercing work is performed.

(7) As disclosed in Japanese Patent Unexamined Publication No. Hei.9-277071, piercing time is reduced by simplifying the operation of a nozzle when the piercing work is performed in a workpiece. In addition, in order to overcome a conventional troublesomeness which moves the nozzle upwardly so that a gap between the nozzle and the protrusion of the molten substance formed in the workpiece is secured when the cutting work is performed and to remove the molten substance securely, this publication discloses that a blow gas is blown from a blow nozzle while blowing an assist gas from a center nozzle, so as to blow off the molten substance.

In the method of (7), the blowing of the blow gas is started after the passage of a predetermined time after piercing work is started so as to prevent the assist gas from being cut off, and then the blow gas is continuously blown out until the piercing work is completed, so that the protrusion of the molten substance is removed. However, the continuous blowing of the blow gas after the passage of the predetermined time keep interrupting the flow of assist gas, and thus it has made ineffective to reduce the machining time because oxidative reaction according to the assist gas is suppressed. Further, since, in the piercing work, only the assist gas blows off the molten substance before the blowing of the blow gas, it has also made ineffective to reduce the piercing time.

SUMMARY OF THE INVENTION

In view of the foregoing problems existing in the related art, an object of the present invention is to provide a laser beam machining method and a laser beam machine which can drastically reduce machining time.

To attain the above object, according to the invention, there is provided a laser beam machining method including the steps of, irradiating a laser beam on a machining portion of a workpiece for the machining thereof, blowing out an assist gas toward the machining portion of the workpiece continuously during the irradiating step, and blowing out a blow gas toward the machining portion intermittently during the irradiating step.

DETAILED DESCRIPTION OF THE PREFERRED EMBODIMENTS (First Embodiment)

A first embodiment of the invention will now be described with reference to FIGS. 1–4, and the construction of a laser beam machine will be described first.

Figure 1:
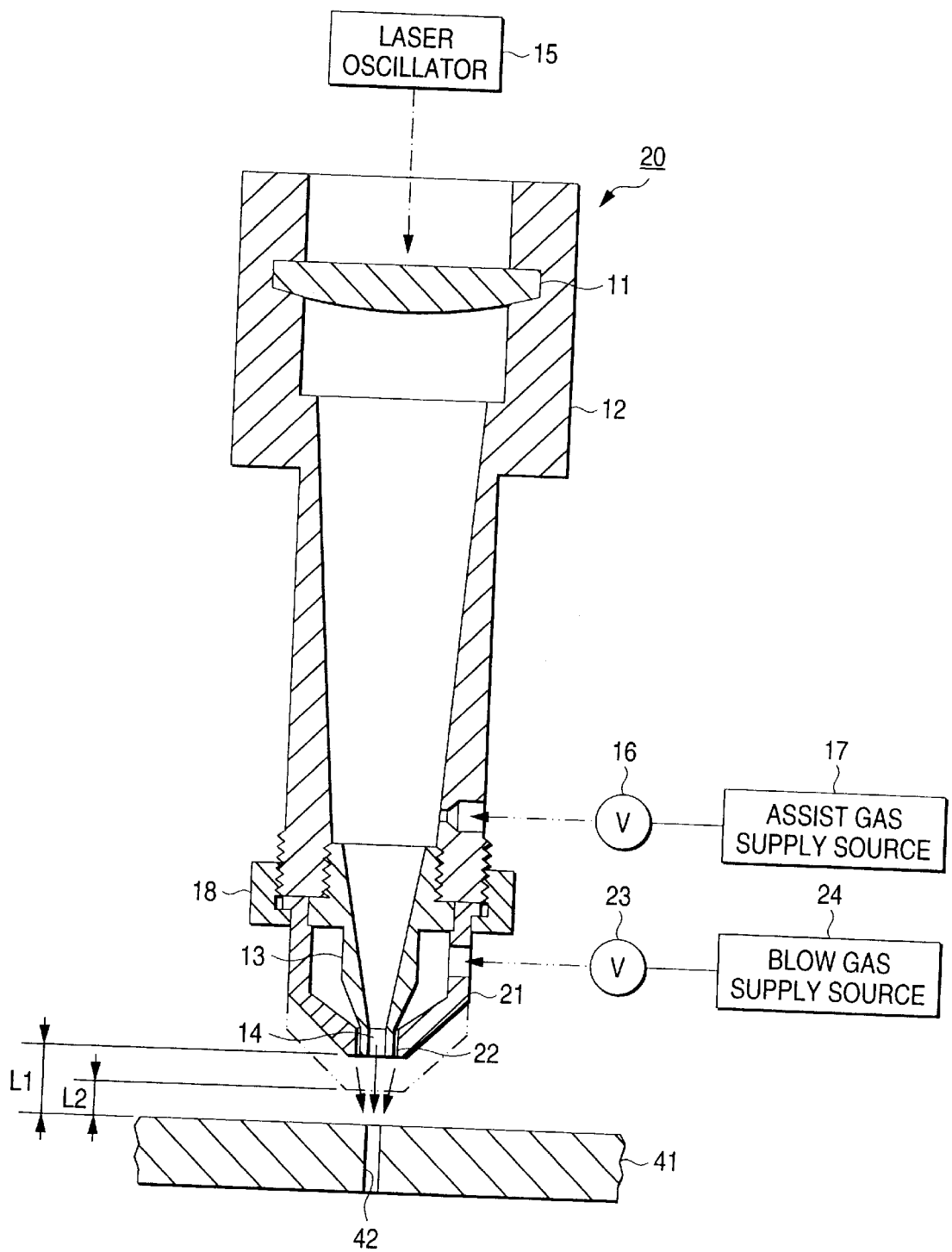
FIG. 1 is a sectional view of the main part of a laser beam machine in a first embodiment of the invention.

As shown in FIG. 1, in the machining head 20 of a laser beam machine, a center nozzle 13 is fixed to the lower end of a holder 12 having a lens 11, and an assist-gas nozzle port 14 is formed at the lower end of the center nozzle 13. The laser beam outputted from a laser oscillator 15 is passed through the lens 11 and then is irradiated from the nozzle port 14 toward a workpiece 41. A assist gas supply source 17 is coupled via an assist gas supply valve 16 to the inside of the holder 12. While the assist gas supply valve 16 is opened, an assist gas composed of oxygen for oxidation-melting the workpiece is supplied from the assist gas supply source 17 into the holder 12. The assist gas is then jetted from nozzle port 14 of the center nozzle 13 toward the machining portion of the workpiece 41.

A blow nozzle 21 is fixed to the lower end of the holder 12 by screwing a ring 18 into the lower end thereof so as to surround the center nozzle 13, and a blow-gas nozzle port 22 is formed at the lower end of the blow nozzle 21. A blow gas supply source 24 is coupled via a blow gas supply valve 23 to the inside of the blow nozzle 21. While the blow gas supply valve 23 is opened, a blow gas composed of an inert gas such as nitrogen gas or the like is supplied from the blow gas supply source 24 into the blow nozzle 21, and then jetted from the nozzle port 22 toward the machining portion of the workpiece 41. The blow gas is used to blow off dross as molten substance. The nozzle port 22 of the blow nozzle 21 is formed anuularly and concentrically with respect to the nozzle port 14 of the center nozzle 13, and the blow gas is annularly jetted out so as to surround the jet flow of the assist gas.

Figure 2:
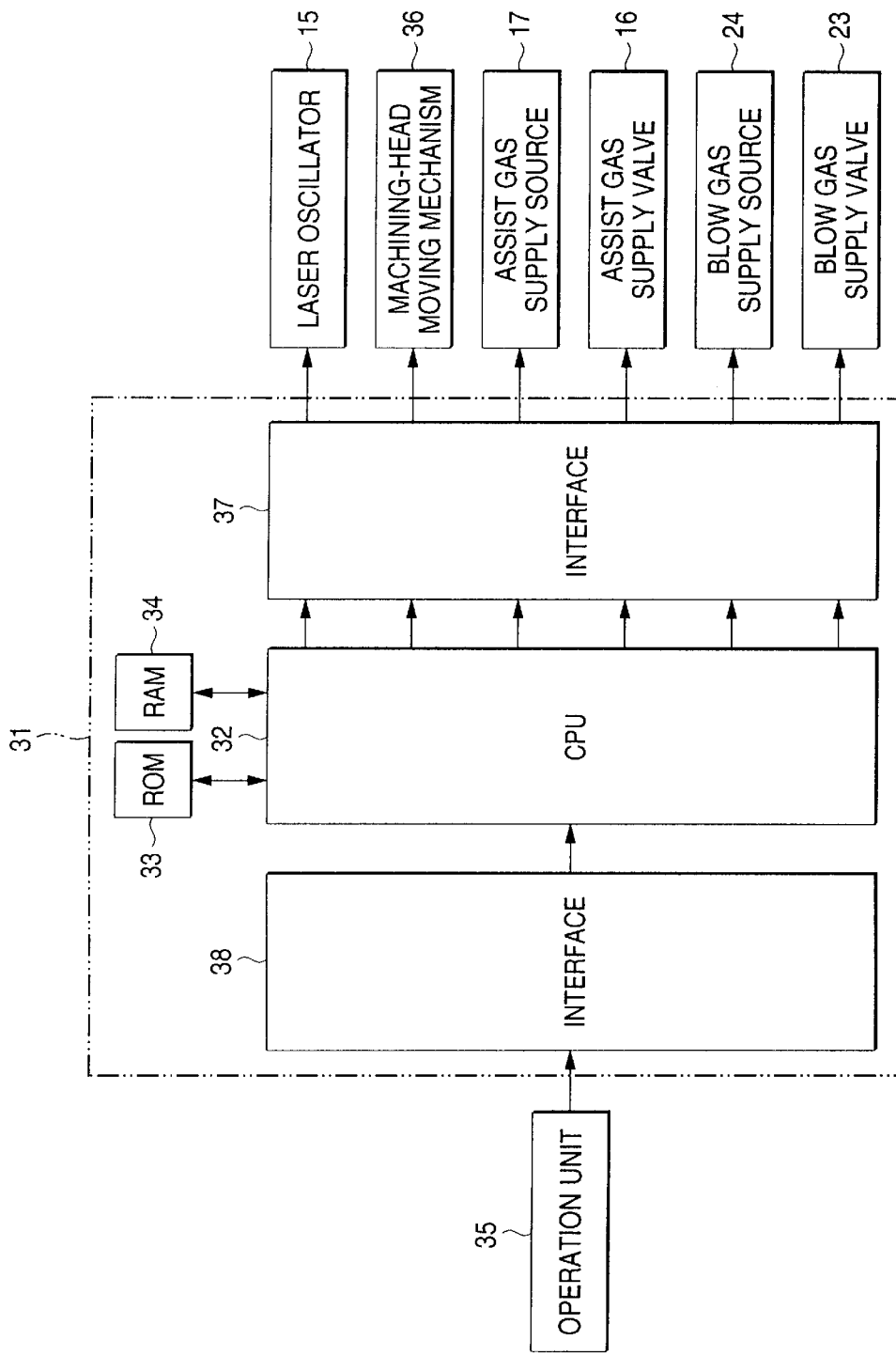
FIG. 2 is a block diagram of a circuit configuration in the laser beam machine.

As shown in FIG. 2, a control unit 31 includes CPU (Central Processing Unit) 32, ROM (Read Only Memory) 33 for storing machine controlling programs and RAM (Random Access Memory) 34 for storing transient data. An operation unit 35 is connected via an interface 38 to the control unit 31. Further, a machining-head moving mechanism 36 in addition to the laser oscillator 15, the assist gas supply source 17, the assist gas supply valve 16, the blow gas supply source 24 and the blow gas supply valve 23 is connected via an interface 37 to the control unit 31. The machining-head moving mechanism 36 is used for moving the machining head 20 in three directions of X, Y and Z.

On the basis of the operation of the operation unit 35, the control unit 31 actuates the machining-head moving mechanism 36 so as to move the machining head 20 in at least one of the three directions of X, Y and Z. Simultaneously, the control unit 31 drives the laser oscillator 15 to irradiate the machining portion of the workpiece 41 with a laser beam and controls the assist gas supply source 17, the assist gas supply valve 16, the blow gas supply source 24 and the assist gas supply valve 23 so that the assist gas and the blow gas are jetted to the machining portion of the workpiece 41 at predetermined timing. Various operations according to the control of the control unit 31 will be described hereinafter.

The piercing operation of the workpiece 41 will now be described.

When a piercing-work starting command is entered into the control unit 31 from the operation unit 35, the machining head 20 is moved according to the program stored in the ROM 33 so that the space between the nozzle ports 14 and 22 of the center and blow nozzles 13 and 21 and the workpiece 41 may become L1. In this condition, as shown in time charts of FIG. 3, the assist gas supply valve 16 is opened by the control unit 31 of FIG. 2, so that the assist gas is jetted from the nozzle port 14 of the center nozzle 13 to the machining portion of the workpiece 41. At the time the machining portion has been filled up with the assist gas (oxygen), the laser beam is irradiated toward the machining portion of the workpiece 41, whereby the piercing work is started. The most suitable timing at which the assist gas is blown is 0.2 second or more prior to the irradiation of the laser beam.

The blow gas supply valve 23 is opened instantaneously after the passage of about 0.4 second from the start of irradiation of the laser beam, whereby the blow gas is jetted for 0.2 second from the nozzle port 22 of the blow nozzle 21 to the machining portion of the workpiece 41. Although an effective interval between the start of irradiation of the laser beam and the start of blowing of the blow gas is from 0.2 to 0.8 second, about 0.4 second of the above interval is most suitable in this embodiment of the invention. Moreover, though the jetting time of the blow gas is from about 0.1 to 1.0 second depending on the plate thickness, about 0.2 second is most suitable in this embodiment of the invention.

Figure 4:
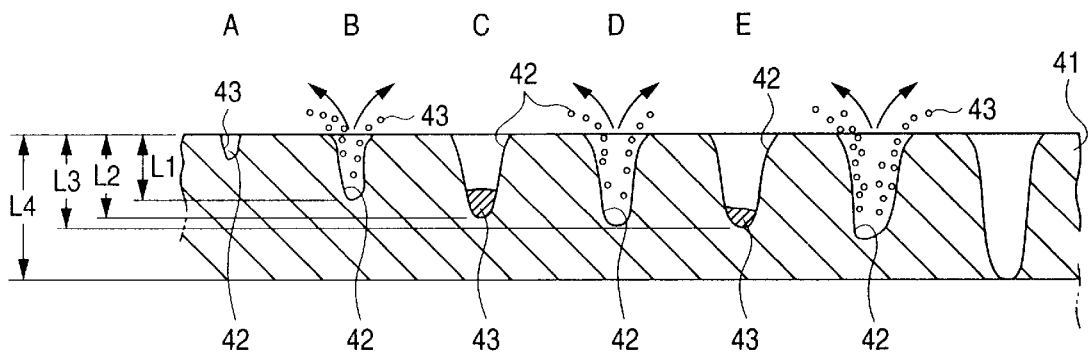
FIG. 4 is a diagram illustrating states of machining portions in order during piercing work.

Jetting out the blow gas results in blowing off dross 43 as the molten substance formed by the laser beam in a cut hole 42 as shown in the portion B of FIG. 4. Consequently, the dross 43 in the cut hole 42 is removed and a new surface of the cut hole 42 is exposed to not only the laser beam but the assist gas. Further, blowing out the blow gas instantaneously causes the cut surface to be cooled suitably and excessive oxidation is suppressed, so that the generation of excessive dross 43 is restrained. Moreover, the jetting of the assist gas and irradiation of the laser beam on the exposed surface to be cut are continued, to thereby perform continuous piercing work by the laser beam as shown in the portion C of FIG. 4. With passage of about 0.4 second after the previous blowing of the blow gas is stopped, the blow gas supply valve 23 is instantaneously opened and the blow gas is jetted out for about 0.2 second, whereby the dross 43 is blown off and removed as shown in the portion D of FIG. 4. Even in this case, it is most suitable to jet out the blow gas for about 0.2 second.

While the piercing work is continued, the machining head 20 is kept moving down until the space between the nozzle ports 14 and 22 and the workpiece 41 comes up to an ordinary machining height of L2. Consequently, the focal point of the laser beam always conforms to the machining portion, and the assist gas and the blow gas can be jetted out toward the cut surface while preventing them from diffusing. Therefore, it is possible to not only carry out efficient machining using the laser beam but also utilize the blow gas effectively.

Upon the termination of the piercing work, a very small amount of residual dross 43 is blown downward simultaneously when the cut hole 42 is penetrated. Then the machining head 20 is moved laterally while maintaining the aforementioned space L2 when changed to cutting work. However, no blow gas is jetted out during the cutting work.

As described the above, while the piercing work is continued, the blow gas is jetted out intermittently toward the machining portion of the workpiece 41 and the dross 43 is removed by the jetting of the blow gas. In consequence, the piercing work is performed free from being substantially interrupted by the dross 43 and this allows the piercing work to be performed efficiently and also the machining time to be reduced drastically. Furthermore, the dross 43 is prevented from protruding from the upper edge portion of the cut hole 42, and the lateral movement of the machining head 20 can be made smoothly after the piercing work since the cutting thickness around the cut hole is not varied due to the dross 43.

Figure 6:
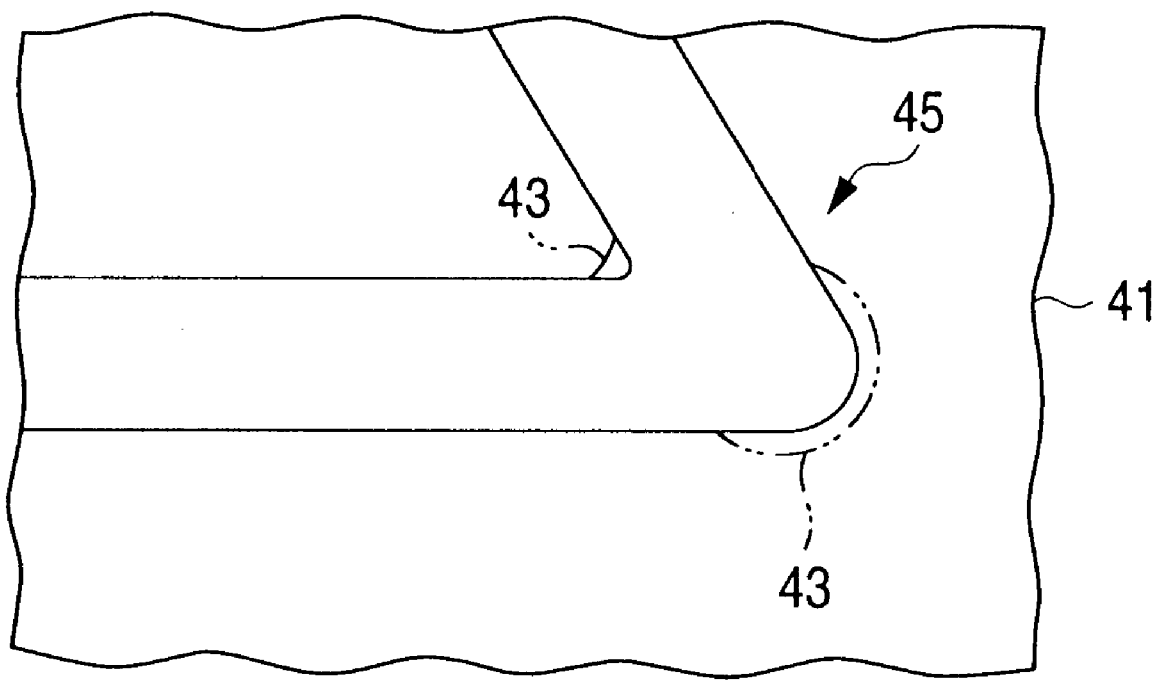
FIG. 6 is a partial plan view of a corner portion of the groove cut in the workpiece.

As shown in FIG. 6, during the time the corner portion 45 of the workpiece 41 is subjected to the cutting work, the machining head 20 moves while maintaining the space L2. When the center nozzle 13 reaches the corner portion 45 in this case, further, the blow gas is intermittently blown out toward the machining portion at the same interval of jetting time and at the same timing as the above piercing work, namely, at intervals of 0.2–0.8 second from a point of time at which the center nozzle 13 has arrived at the corner portion 45. When the cutting work is performed in the corner portion 45 where the dross 43 is produced very much, such cutting work can be performed efficiently and correctly in a short time and in addition, can prevent the dross 43 from protruding from the edge portion of the upper side of the groove formed by cutting. Accordingly, the movement of the machining head 20 is never interrupted by the dross 43 and is able to perform smoothly in even the corner portion.

In this connection, "the corner portion" represents a portion which sharply changes the cutting direction of the workpiece. The determination of the corner portion and a non-corner portion such as a linear portion and a smooth curved portion is judged from a machining program stored in the RAM 34 by the CPU of the control unit 31. Specifically, the control unit 31 decides the changing position of the workpiece as "the corner portion" when the angle connecting with lines of two cutting directions at the changing position is less than a predetermined angle, for example, 90°.

The aforementioned embodiment of the invention demonstrates the following effect:

(1) The dross 43 of the machining portion is removed by intermittently blowing out the blow gas toward the machining portion, so that the laser beam machining is performed for a new cut surface at all times with the laser beam and the assist gas. Moreover, the machining portion is suitably cooled by intermittently blowing out the blow gas, so that excessive dross 43 is prevented from being produced. Since the blow gas is blown out intermittently and in an instant, the oxidative action is almost not interrupted by the assist gas. Therefore, piercing work that has heretofore been difficult to do can be done efficiently in a short time.

TABLE 1

| | Piercing Time | |
|---|---|---|
| Conditions Thickness of steel plate | Conventional example: Laser output: 3 KW Assist gas pressure: 2 kg/cm$^2$ Inert gas: not used | Present invention: Laser output: 3 KW Assist gas pressure: 2 kg/cm$^2$ Intermittent inert gas pressure: 5 kg/cm$^2$ |
| 6 mm | 2.5 sec. | 0.5 sec. |
| 9 mm | 7.0 sec. | 0.5 sec. |
| 12 mm | 10.0 sec. | 1.0 sec. |
| 16 mm | 15.0 sec. | 1.5 sec. |
| 19 mm | 21.0 sec. | 2.0 sec. |

Figure 3:
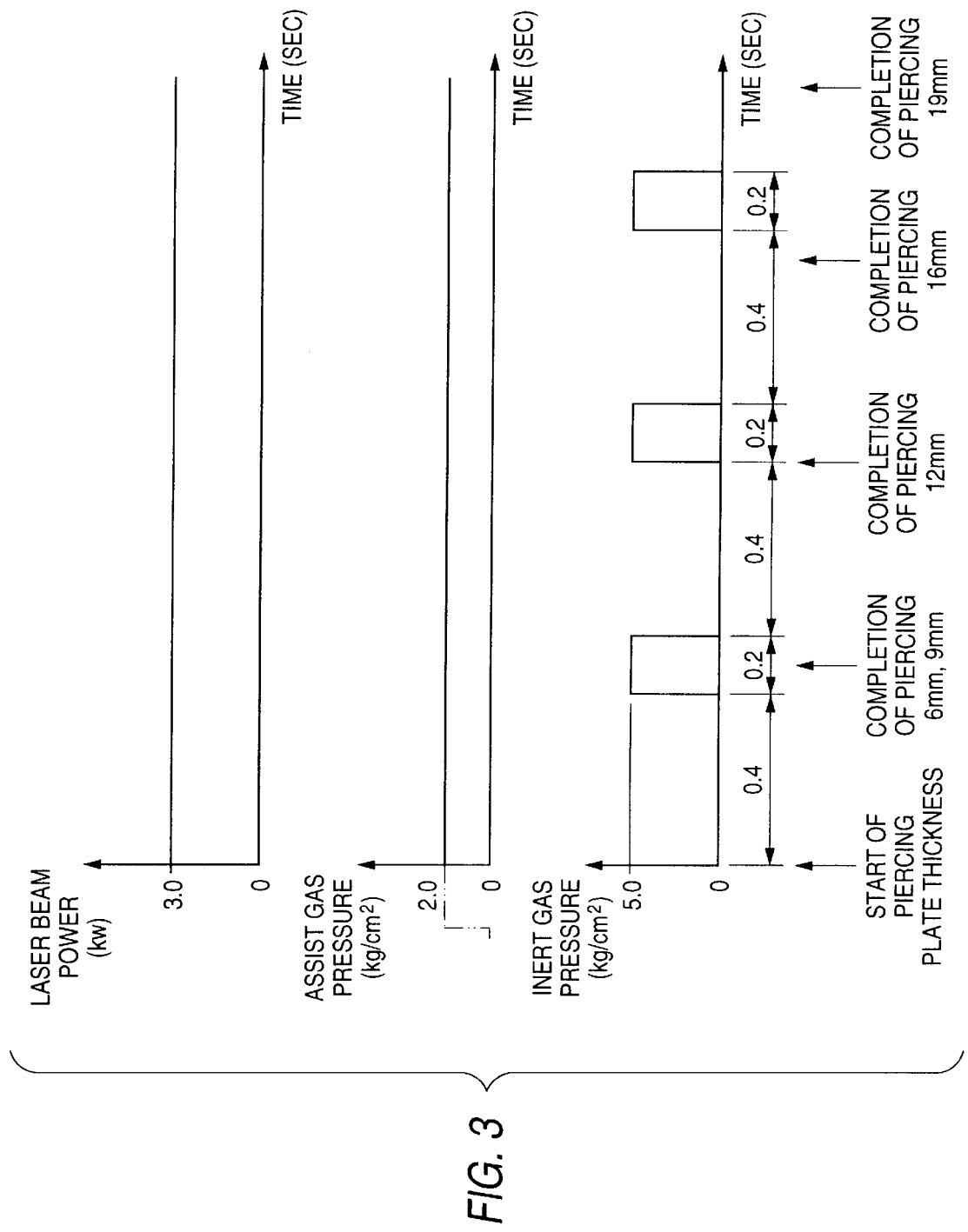
FIG. 3 is a time chart showing timing at which a laser beam is irradiated and a gas is blown out.

The data in Table 1 shows the results of the piercing work performed at the aforementioned optimum timing under the machining conditions shown in FIG. 3, including using steel plates as workpieces 41, setting assist-gas jet pressure at 2.0 kg/cm$^2$, and setting blow-gas jet pressure at 5.0 kg/cm$^2$. As is obvious from these results, it became possible to make much shorter the time required for the piercing work than what is required in the conventional method.

As the machining time is thus reduced, the amount of dross 43 is reduced, that is, the useless amount of molten workpiece is reduced and fine piercing or cutting is made possible, to thereby attain the precise machining. As the dross 43 is blown off, moreover, the dross 43 is prevented from protruding up in the machining portion to thereby ensure that the machining head 20 is moved smoothly for cutting purposes.

Particularly, the present invention is highly effective as the thickness of a workpiece increases. In case that a workpiece is a steel plate having 12 mm thickness and required for 100 holes to be bored, for example, the machining time can be reduced by 15 min. per sheet with respect to only piercing time as compared with the conventional method.

(2) Further, the assist gas is blown out before irradiation of the laser beam is started so as to ensure that the machining portion is surrounded in the oxygen atmosphere of assist gas when irradiation of the laser beam is started. Therefore, laser beam machining can be carried out efficiently from the start thereof.

(3) The blow gas is blown out intermittently only at a predetermined timing from the start of irradiation of the laser beam; in other words, the blow gas is jetted out instantaneously at fixed intervals. Thus, since the laser beam is effectively irradiated toward the surface of the workpiece without spoiling the acceleration of oxidation by the assist gas, the dross 43 is removed immediately when it is produced.

(4) The blow gas pressure is set higher than the assist gas pressure, to thereby ensure that the dross 43 is blown off and removed by the blow gas without being interrupted by the assist gas. In this case, the assist gas is instantaneously diffused by the blow gas; however, because the diffusion time is short, laser beam machining is not badly affected.

(5) The center and blow nozzles 13 and 21 are moved closer to the workpiece 41 as the laser beam machining progresses, whereby the focal point of the laser beam can be directed to the machining portion at all times and simultaneously the assist gas pressure on the cut surface can also be kept constant, to thereby ensure that the laser beam machining is carried out with efficiency.

(6) The blow gas is blown out from an annular zone centering on the assist gas flow, to thereby ensure that the dross 43 can be blow off even though it is located in any position.

(Second Embodiment)

Figure 5:
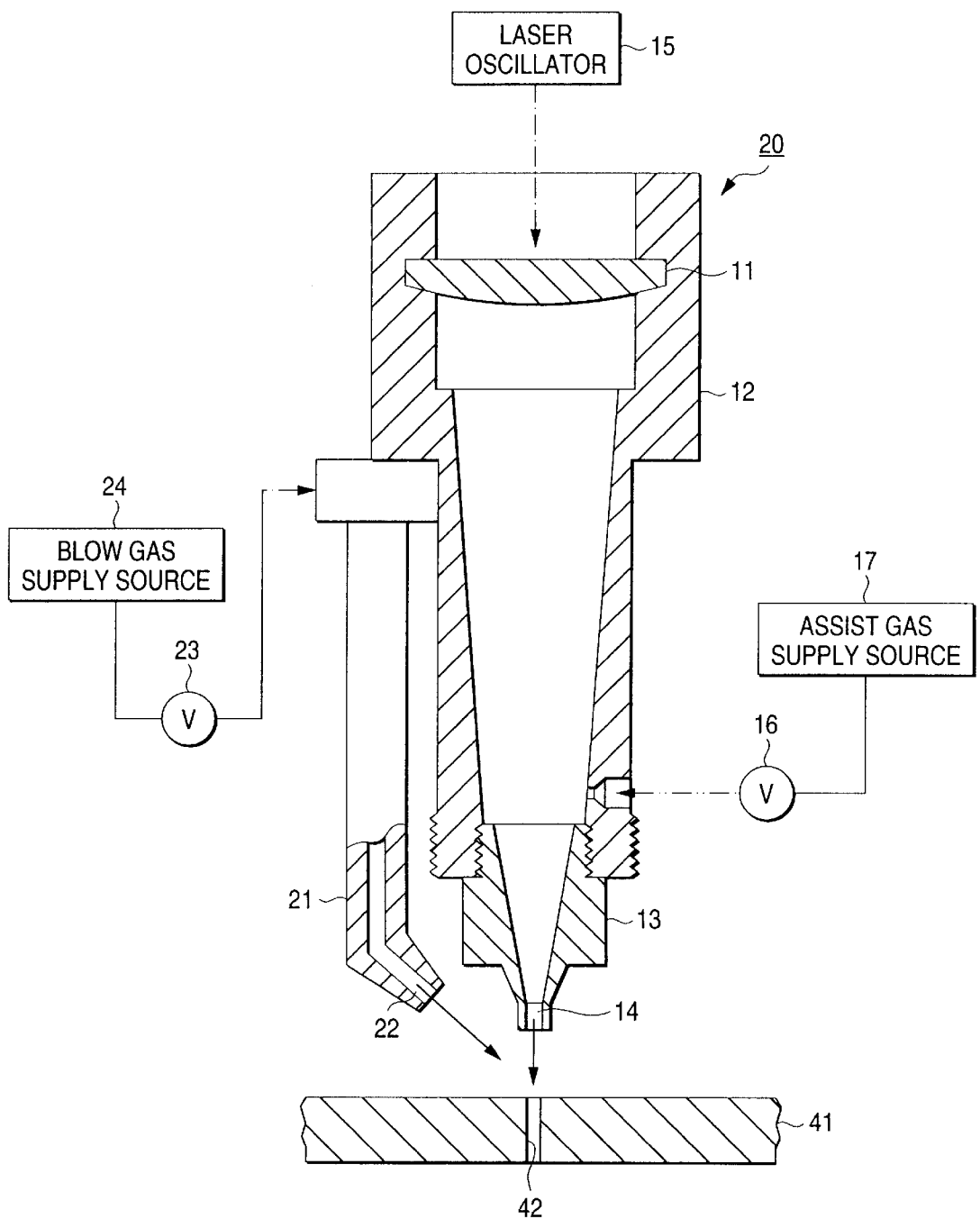
FIG. 5 is a sectional view of the main part of a laser beam machine in a second embodiment of the invention.

A second embodiment of the invention will now be described with reference to FIG. 5. In this second embodiment of the invention, the blow nozzle 21 is supported to the holder 12 and laterally positioned relative to the center nozzle 13. Further, the nozzle port 22 of the blow nozzle 21 is obliquely directed to the machining portion so that the blow gas may flow obliquely across the assist gas flow.

In the second embodiment of the invention, the blow nozzle 21 is easily fitted to the holder 12 without having the blow nozzle 21, whereby the aforementioned various effects become obtainable.

Incidentally, this invention may be implemented in the following mode including:

(1) altering delay time until the start of irradiation of the laser beam after the start of blowing of the assist gas, delay time until the start of blowing the blow gas after the start of blowing the assist gas, blow-gas blowing intervals, blowing time or the like in accordance with the material quality and plate thickness of the workpiece 41;
(2) using a plurality of blow nozzles in the second embodiment of the invention;
(3) blowing out the blow gas intermittently as in the aforementioned embodiments of the invention even in the laser beam machining excluding the piercing work or cutting of the corner portion;
(4) performing the piercing work still at a high position and starting the ordinary cutting work after the nozzle is lowered to the machining height upon the termination of the piercing work, although the machining head 20 has been lowered gradually as the laser beam machining progresses in the aforementioned embodiments of the invention;
(5) increasing the blow-gas blowing time interval or blow-gas blowing time period because the bottom of the hole tends to become deeper as the plate thickness increases, although the blow gas has been blown out at equal intervals in the aforementioned embodiments of the invention; and
(6) blowing out the blow gas by instantaneously directing the blow nozzle to the machining portion with the pivotable blow nozzle, although the blow gas supply valve has been used to blow out the blow gas in the aforementioned embodiments of the invention.

As described the above, according to the first aspect of the present invention, a blow gas is intermittently blown out toward a machining portion, in particular, a piercing portion in piercing work or a corner portion where cutting work is performed.

Consequently, the molten substance produced in the machining portion is instantaneously and intermittently blown off by the blow gas, and a new cut surface is exposed to a laser beam. Therefore, the laser beam is less interfered by the molten substance in irradiating the cut surface, to thereby improve machining speed. Moreover, the intermittent blowing of the blow gas minimizes the interruption of assist gas flow, so that oxidative action by means of an assist gas is almost never suppressed. Moreover, since the blow gas is intermittently blown out, the machining portion is not excessively but moderately cooled. Thus, excessive oxidation is prevented and the amount of molten substance being an obstacle to piercing is decreased. As a result, piercing time can be considerably reduced. Moreover, the small amount of molten substance produced contributes to the precise machining. In the corner portion, in particular, the amount of molten substance increases and machining precision lowers because the quantity of heat per unit time and oxygen as the assist gas become excessive because of the deterioration of cutting speed. However, these problems are solved according to the present invention, so that the amount of molten substance produced is minimized with the effect of preventing the cutting width from locally increasing.

Further, an inert gas may be used as the blow gas. Accordingly, the excessive oxidation of the machining portion is suppressed to ensure smooth piercing.

The blowing of the blow gas may be delayed by a predetermined time interval after irradiation of the laser beam is started. Specifically, the blow gas is blown out toward the machining portion for only 0.1–1.0 sec. a predetermined time after the start of irradiation of the laser beam, and the blow gas is also blown out intermittently toward the machining portion for only 0.1–1.0 sec. a predetermined time after the predetermined time interval.

As the blow gas is blown out in such a condition that the molten substance has been formed, the molten substance is removed for certain and the machining portion is prevented from being excessively cooled, so that it is promoted to reduce the machining speed.

Moreover, the blow gas may be blown out toward the machining portion for only a time period shorter than the laser-beam irradiation time period.

Therefore, the blow gas operates to blow off molten substance in course of growth so as to have a new cut surface exposed to the laser beam without allowing oxidative action in piercing a workpiece with the laser beam and the assist gas to be interrupted by the oxidation suppressing action by the blow gas. Thus, the piercing work can be performed in a short time.

Further, a nozzle may perform the piercing work while moving closer to the workpiece as the piercing work progresses.

Therefore, the nozzle is set so as not to depart from the cut surface even though the piercing work progresses, and assist gas pressure relative to the cut surface is properly maintained and the laser beam machining can be surely carried out while letting the focal point of the laser beam match with the bottom of the hole of the cut surface. Further, upon the termination of the piercing work, the residual molten substance in the machining portion is surely blown off downward by the assist gas pressure simultaneously with the formation of a through-hole.

Consequently, the periphery of the pierced hole is prevented from growing thick, to thereby reduce the machining speed and increase machining precision.

In addition, blow gas pressure may be set higher than the assist gas pressure in the machining portion.

Therefore, the molten substance can be blown off instantaneously by the blow gas. Since the one-shot blow gas is blown off intermittently, the excessive oxidative action by the assist gas is almost unaffected and the effect attained in the removal of the molten substance is rather greater.

The blow gas may be blown out from an annular zone centering on the assist gas flow. Accordingly, the blow gas is blown out from all directions, whereby the molten substance is decreased in size and blown off surely.

On the other hand, the blow gas may be blown out from a side of assist-gas blowing zone so that the blow gas may flow obliquely across the assist gas flow. In this case, a nozzle for blowing out a blow gas may have the same shape as that of any related nozzle and also may be post-fitted. Accordingly, the effect of the invention is applicable to existing laser beam machines.

According to the second aspect of the present invention, a laser beam machine is provided with a blow nozzle for blowing out a blow gas toward the machining portion of a workpiece, the blow nozzle being disposed outside a center nozzle, and a control unit controlling the operation of the laser beam machine so that the blow gas may be blown out intermittently from the blow nozzle.

In addition, the nozzle port of the blow nozzle for blowing out the blow gas may be provided concentrically relative to the nozzle port of the nozzle for blowing out an assist gas.

On the other hand, the blow nozzle for blowing out the blow gas may be provided separately from the nozzle for blowing out the assist gas so as to be directed to the machining portion.

With the laser beam machine thus structured, the effect described in the above is obtained.

The present disclosure relates to the subject matter contained in Japanese patent application No. Hei. 10-208448 filed on Jul. 23, 1998 which is expressly incorporated herein by reference in its entirety.

While only certain embodiments of the invention have been specifically described herein, it will apparent that numerous modifications may be made thereto without departing from the spirit and scope of the invention.

What is claimed is:

1. A laser beam machining method, comprising the steps of:
   irradiating a laser beam on a machining portion of a workpiece for the machining thereof;
   blowing out an assist gas toward said machining portion of the workpiece continuously during said irradiating step; and
   blowing out a blow gas toward said machining portion of the workpiece intermittently during said irradiating step.

2. A laser beam machining method according to claim 1, further comprising a piercing step piercing the workpiece,
   wherein said piercing step is conducted with said irradiating step, said assist-gas continuous blowing step and said blow-gas intermittent blowing step.

3. A laser beam machining method according to claim 1, wherein the blow gas for use is an inert gas.

4. A laser beam machining method according to claim 1, wherein the blowing of the blow gas is delayed by a predetermined time interval after the irradiation of the laser beam is started.

5. A laser beam machining method according to claim 1, wherein the blow gas is blown out toward said machining portion for 0.1–1.0 sec. after the passage of a predetermined time from the start of irradiation of the laser beam, and wherein the blow gas is blown out intermittently toward the machining portion for 0.1–1.0 sec. at intervals of said predetermined time.

6. A laser beam machining method according to claim 2, wherein, when said piercing step is started, a nozzle for the assist gas and a nozzle for the blow gas are respectively disposed on a predetermined position, and said nozzles are approached to the workpiece as said piercing step progresses.

7. A laser beam machining method according to claim 1, wherein blow gas pressure in said machining portion is set higher than assist gas pressure therein.

8. A laser beam machining method according to claim 1, further comprising the steps of:
   cutting a corner portion of the workpiece; and
   cutting a non-corner portion of the workpiece,
   wherein said corner cutting step is conducted with said irradiating step, said assist-gas continuous blowing step and said blow-gas intermittent blowing step, and said non-corner cutting step is conducted with said irradiating step and said assist-gas continuous blowing step.

9. A laser beam machining method according to claim 1, wherein the blow gas is blown out from an annular zone centering on a blowing zone of the assist gas.

10. A laser beam machining method according to claim 1, wherein the blow gas is blown out obliquely with respect to a blowing direction of the assist gas from a side of a blowing zone of the assist gas.

11. A laser beam machine comprising:
    a laser oscillator irradiating a laser beam on a machining portion of a workpiece;
    a center nozzle blowing out an assist gas toward said machining portion of the workpiece;
    a blow nozzle blowing out a blow gas toward said machining portion of the workpiece and disposed outside said center nozzle; and
    a control unit controlling an operation of the laser beam, an operation of the assist gas to blow out the assist gas toward said machining portion of the workpiece continuously during irradiating the laser beam thereon, and an operation of the blow gas to blow out the blow gas toward said machining portion of the workpiece intermittently during irradiating the laser beam thereon.

12. A laser beam machine according to claim 11, wherein a nozzle port of said blow nozzle is disposed concentrically relative to a nozzle port of said center nozzle.

13. A laser beam machine according to claim 11, wherein said blow nozzle is provided separate from said center nozzle so that a blowing of the blow gas is directed to said machining portion of the workpiece.

14. A laser beam machine according to claim 11, wherein said control unit controls the operation of the blow gas during the machining work so that the blow gas is blown out toward said machining portion for 0.1–1.0 sec. after the passage of a predetermined time from the start of irradiation of the laser beam, and the blow gas is blown out intermittently toward the machining portion for 0.1–1.0 sec. at intervals of said predetermined time.

\* \* \* \* \*